US012651094B2

(12) United States Patent
Bar-Ness et al.

(10) Patent No.: US 12,651,094 B2
(45) Date of Patent: Jun. 9, 2026

(54) SEAMLESS AND SECURE CLOUD TO COMPUTER POINTER RELAY

(71) Applicant: Microsoft Technology Licensing, LLC, Redmond, WA (US)

(72) Inventors: Assaf Bar-Ness, Rehovot (IL); Netanel Hadad, Lod (IL); Shoham Dekel, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 85 days.

(21) Appl. No.: 18/438,109

(22) Filed: Feb. 9, 2024

(65) Prior Publication Data

US 2025/0209216 A1 Jun. 26, 2025

Related U.S. Application Data

(60) Provisional application No. 63/612,448, filed on Dec. 20, 2023.

(51) Int. Cl.
*G06F 21/83* (2013.01)
*G06F 21/60* (2013.01)

(52) U.S. Cl.
CPC ............ *G06F 21/83* (2013.01); *G06F 21/602* (2013.01)

(58) Field of Classification Search
None
See application file for complete search history.

(56) References Cited

U.S. PATENT DOCUMENTS

| | | | | |
|---|---|---|---|---|
| 11,182,073 B2 * | 11/2021 | Ragan, Jr. | ........... | G06F 3/03543 |
| 11,405,367 B1 * | 8/2022 | Kuo | ........................ | G06F 21/85 |

(Continued)

FOREIGN PATENT DOCUMENTS

| | | | | |
|---|---|---|---|---|
| EP | 3010199 A1 * | 4/2016 | .......... | H04L 63/061 |
| WO | WO-2020243362 A1 * | 12/2020 | .......... | G06F 21/602 |
| WO | 2022166927 A1 | 8/2022 | | |

OTHER PUBLICATIONS

Navarrete, Jean, "DRM for WebRTC: End-to-end security for video streaming", Retrieved From: https://castlabs.com/news/webrtc-drm-end-to-end-security/, Mar. 14, 2023, 13 Pages.

*Primary Examiner* — Jeffrey R Swearingen
(74) *Attorney, Agent, or Firm* — Weaver IP L.L.C.

(57) ABSTRACT

A seamless and secure cloud to PC pointer relay allows a pointer/cursor to be moved between secure and unsecure windows while being displayed with smooth transitions and while transitioning between secure and unsecure data handling for pointer information. A secure input unit encrypts pointing device operations in the secure window. A user (host) computing device performs location calculations on encrypted data, which conceals pointing device operations in the secure window from the host operating system. The secure unit decrypts the encrypted data returned by the host operating system to determine the calculated pointer location information. The secure unit relays the calculated pointer operation information to the source of the secure window (e.g., remote cloud server) to process user interaction with the secure window while keeping the host operating system unaware of user activity in the secure window (e.g., other than position, if the host renders the pointer).

20 Claims, 6 Drawing Sheets

(56) References Cited

U.S. PATENT DOCUMENTS

| | | | |
|---|---|---|---|
| 2005/0193143 | A1 | 9/2005 | Meyers |
| 2009/0282359 | A1 | 11/2009 | Saul |
| 2010/0269039 | A1 | 10/2010 | Pahlavan et al. |
| 2011/0078532 | A1 | 3/2011 | Vonog et al. |
| 2012/0011280 | A1 | 1/2012 | Gilboa |
| 2012/0011445 | A1 | 1/2012 | Gilboa |
| 2012/0265981 | A1 | 10/2012 | Moon et al. |
| 2013/0106698 | A1 | 5/2013 | Zhang |
| 2014/0071833 | A1 | 3/2014 | Agrawal |
| 2015/0220242 | A1 | 8/2015 | Guest |
| 2018/0159896 | A1* | 6/2018 | Soman ................ H04L 63/1491 |
| 2022/0229908 | A1* | 7/2022 | Peisert .................... G06F 21/53 |
| 2022/0414272 | A1* | 12/2022 | Karri ....................... G06F 21/84 |

* cited by examiner

500

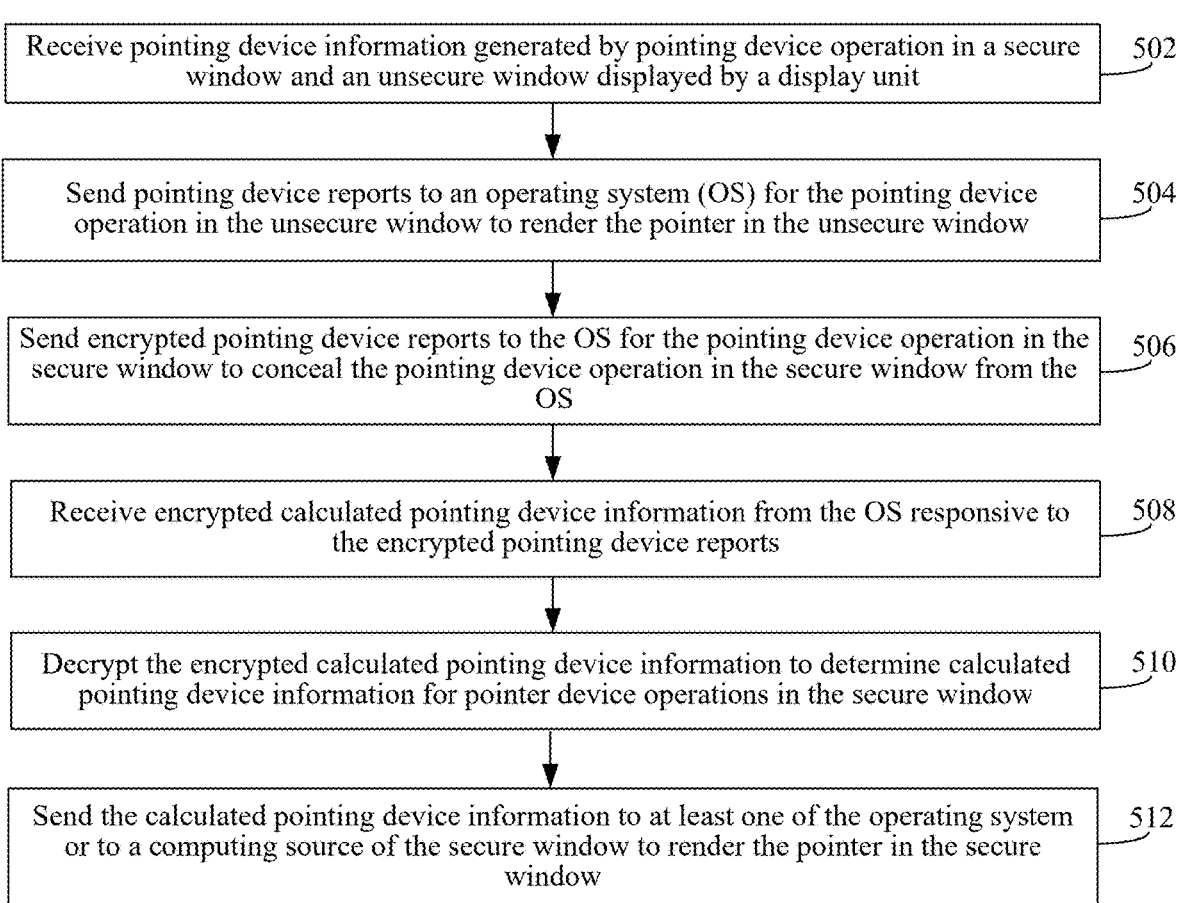

| Receive pointing device information generated by pointing device operation in a secure window and an unsecure window displayed by a display unit | 502 |

↓

| Send pointing device reports to an operating system (OS) for the pointing device operation in the unsecure window to render the pointer in the unsecure window | 504 |

↓

| Send encrypted pointing device reports to the OS for the pointing device operation in the secure window to conceal the pointing device operation in the secure window from the OS | 506 |

↓

| Receive encrypted calculated pointing device information from the OS responsive to the encrypted pointing device reports | 508 |

↓

| Decrypt the encrypted calculated pointing device information to determine calculated pointing device information for pointer device operations in the secure window | 510 |

↓

| Send the calculated pointing device information to at least one of the operating system or to a computing source of the secure window to render the pointer in the secure window | 512 |

FIG. 5

SEAMLESS AND SECURE CLOUD TO COMPUTER POINTER RELAY

CROSS-REFERENCE TO RELATED APPLICATIONS

This application claims priority to U.S. Provisional Patent Application Ser. No. 63/612,448, filed Dec. 20, 2023, and titled "SEAMLESS AND SECURE CLOUD TO COMPUTER POINTER RELAY," the entirety of which is incorporated by reference herein.

BACKGROUND

Computing devices may be used to access other computing devices, such as cloud servers, to consume or generate content. For example, a user may access confidential company resources in a cloud server using a personal or company computing device. The confidential information may be generated and displayed securely, such as in a secure window overlay, on the user computing device. The user may switch back and forth between the secure window and unsecure windows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are disclosed herein for seamless and secure cloud to computer pointer relay. A pointer/cursor can be moved between secure and unsecure windows while being displayed with smooth transitions and while transitioning between secure and unsecure data handling for pointer information. A secure input unit encrypts pointing device operations in the secure window. A user (host) computing device performs location calculations on encrypted data, which conceals pointing device operations in the secure window from the host operating system. The secure unit decrypts the encrypted data returned by the host operating system to determine the calculated pointer location information. The secure unit relays the calculated pointer operation information to the source of the secure window (e.g., remote cloud server) to process user interaction with the secure window while keeping the host operating system unaware of user activity in the secure window (e.g., other than position, if the host renders the pointer).

In aspects, a computing device may be configured to support a seamless and secure cloud to computer pointer relay. A computing device includes a central processing unit (CPU), a graphics unit (e.g., GPU), a display unit, and an input unit. The CPU is configured to execute an operating system. The graphics unit is configured to generate a combined image comprising a secure window generated by a secure processor (e.g., in the computing device or another computing device) and an unsecure window generated by the CPU. The display unit is configured to display the combined image. The input unit is configured to receive pointing device (e.g., trackpad/mouse) information (e.g., pointer location, selection/click, scroll operations) generated by pointing device operation in the secure window and the unsecure window displayed by the display unit. The input unit is configured to send pointing device reports (e.g., with relative location information) to the OS for pointing device operation in the unsecure window to render the pointer in the unsecure window. The input unit is configured to send encrypted pointing device reports to the OS for the pointing device operation in the secure window to conceal the pointing device operation in the secure window from the OS. The input unit is configured to receive encrypted calculated (e.g., absolute position) pointing device information from the OS responsive to the encrypted pointing device reports. The input unit is configured to decrypt the encrypted calculated pointing device information to determine calculated pointing device information for pointer device operations in the secure window. The input unit is configured to send the calculated pointing device information to at least one of the operating system or the secure processor to render the pointer in the secure window.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 5 shows a flowchart of a process for seamless and secure cloud to PC pointer relay, according to an embodiment.

Figure 1:
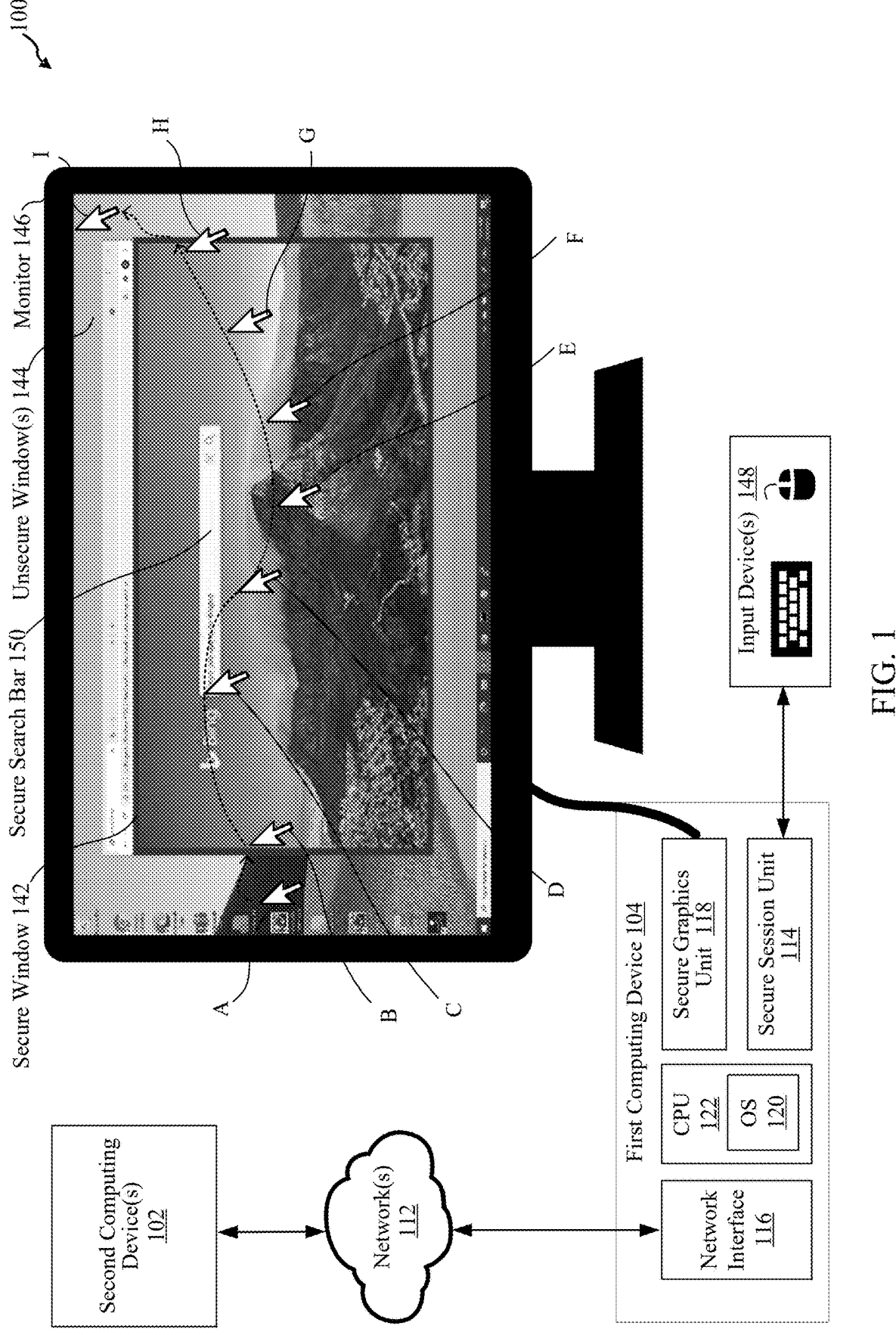
FIG. 1 shows a block diagram of a system configured to provide a seamless and secure cloud to PC pointer relay, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Computing devices may be used to access other (e.g., remote) computing devices, such as cloud servers, to consume or generate content. For example, a user may access confidential company resources in a cloud server using a personal or company computing device. The confidential information may be generated and displayed securely, such as a secure window overlay, on the user computing device. The user may switch back and forth between the secure window and unsecure (e.g., locally generated) windows. Attempting to maintain smooth transitions in the displayed pointer discloses operations in the secure window to the unsecure host operating system. Attempting to conceal the operations by processing all operations in the secure window by the secure processor result in uneven, glitchy display of pointer transitions between secure and unsecure windows.

As such, systems and methods are disclosed herein for seamless and secure cloud to PC pointer relay. A pointer/cursor can be moved between secure and unsecure windows while being displayed with smooth transitions and while transitioning between secure and unsecure data handling for pointer information. A secure input unit encrypts pointing device operations in the secure window. A user (host) computing device performs location calculations on encrypted data, which conceals pointing device operations in the secure window from the host operating system. The secure unit decrypts the encrypted data returned by the host operating system to determine the calculated pointer location information. The secure unit relays the calculated pointer operation information to the source of the secure window (e.g., remote cloud server) to process user interaction with the secure window while keeping the host operating system unaware of user activity in the secure window (e.g., other than position, if the host renders the pointer).

In aspects, a computing device may be configured to support a seamless and secure cloud to PC pointer relay. A computing device includes a processor, a graphics unit (e.g., GPU), a display unit, and an input unit. The processor is configured to execute an operating system. The graphics unit is configured to generate a combined image comprising a secure window generated by a secure processor (e.g., in the computing device or another computing device) and an unsecure window generated by the processor. The display unit is configured to display the combined image. The input unit is configured to receive pointing device (e.g., trackpad/mouse) information (e.g., pointer location, selection/click, scroll operations) generated by pointing device operation in the secure window and the unsecure window displayed by the display unit. The input unit is configured to send pointing device reports (e.g., with relative location information) to the OS for pointing device operation in the unsecure window to render the pointer in the unsecure window. The input unit is configured to send encrypted pointing device reports to the OS for the pointing device operation in the secure window to conceal the pointing device operation in the secure window from the OS. The input unit is configured to receive encrypted calculated (e.g., absolute position) pointing device information from the OS responsive to the encrypted pointing device reports. The input unit is configured to decrypt the encrypted calculated pointing device information to determine calculated pointing device information for pointer device operations in the secure window. The input unit is configured to send the calculated pointing device information to at least one of the operating system or the secure processor to render the pointer in the secure window. Accordingly, by performing these operations in the input unit, the host processor and operating system are prevented from access to unencrypted pointing device operation in the secure window, and thus operations by the pointing device in the secure window are secure from access by malicious actors having access to (e.g., that may compromise) the host processor and/or OS.

As described herein, a pointer or cursor may be moved smoothly in and out of a secure window (e.g., a virtual desktop window) using the host operating system (OS) coordinate system without the OS knowing about the cursor events (e.g., position, click, scroll). Pointing devices, such as a mouse and trackpad, may not use an absolute coordinates system. Pointing device data may be sent in relative form to the pointer's previous position, which may be unknown to the pointing device. The host OS calculates where to move and moves the pointer according to the incoming relative user input (e.g., pointer) reports. When in secure mode, a secure session unit (also referred to herein as an "input unit"), which may be implemented as a motherboard embedded controller (EC), may send input device (e.g., keyboard and trackpad) reports to a remote (e.g., cloud) computing device over a secure channel, hiding the information from the potentially malicious OS on the host computing device. Encryption (e.g., homomorphic encryption) may be used to allow the OS to calculate the cursor absolute position for the secure session unit that may only know relative movements, while maintaining confidentiality of user input in secure session windows. Homomorphic encryption is a form of encryption that allows computations to be performed on encrypted data without first having to decrypt it.

Embodiments have numerous advantages. For instance, relaying input device (e.g., pointing device, keyboard) operations (e.g., pointer location, clicks, scrolling, typing, drawing) securely to secure computing device, such as a remote cloud machine, using dedicated hardware (e.g., a secure input unit) keeps a potentially compromised/malicious local/host OS unaware of secure operations in secure windows (e.g., position, click, scroll). Using different data handling for user operations in unsecure and secure windows, performing calculations on encrypted data, maintains security and allows seamless processing and presentation of user operations, even during transitions between secure and unsecure windows generated by different computing devices.

These and further embodiments may be implemented in various ways. For instance, FIG. 1 shows a block diagram of a system 100 configured to provide a seamless and secure cloud to PC pointer relay, in accordance with an embodiment. Example system 100 includes a first computing device 104 with associated display unit 146 (e.g., a monitor) and input device(s) 148. The first computing device 104 is communicatively coupled to a second computing device 102, e.g., by network(s) 112. First computing device 104 includes a secure session unit 114 (also referred to herein as an "input unit"), a network interface 116, a secure graphics device 118, a CPU 122, e.g., among other components not shown. These components of system 100 are described in further detail as follows.

First computing device 104 is a computing device utilized by one or more users (e.g., individual users, family users, enterprise users, governmental users, administrators, etc.). First computing device 104 may comprise one or more applications, operating systems, virtual machines (VMs), storage devices, etc., that may be executed, hosted, and/or stored therein or via one or more other computing devices (e.g., second computing device(s) 102) via network(s) 112. In an example, first computing device 104 may access one or more server devices (e.g., second computing device(s) 102) via network(s) 112. First computing device 104 may each be any type of stationary or mobile computing device, including a mobile computer or mobile computing device (e.g., a personal digital assistant (PDA), a laptop computer, a notebook computer, a tablet computer, a netbook, etc.), a mobile phone, a wearable computing device, or other type of mobile device, or a stationary computing device such as a desktop computer or PC (personal computer), or a server. First computing device 104 is not limited to physical machines, but may include other types of machines or nodes, such as a virtual machine, that are executed in physical machines. An example computing device with example features is presented in FIG. 6.

First computing device 104 may operate in one or more computing environments and may execute one or more processes in such computing environments. A process is any type of executable (e.g., binary, program, application) that is being executed by a computing device. A computing environment may be any environment in which one or more computing devices may operate and interact, including a client-server system, a multi-computer network, etc. First computing device 104 may execute a browser application, which may execute code (e.g., using a JavaScript engine) to display remote content (e.g., content generated by other computing devices), such as webpages, web applications (web apps), which may have user interfaces (e.g., graphical user interfaces (GUIs)) that user(s) interact with. For example, a remote content GUI displayed by a browser may request computer network login credentials to determine whether a user can access a company's network. A browser application may be configured to communicate (e.g., via network(s) 112) with one or more applications executed by server(s), e.g., second computing device 102.

Second computing device 102 may comprise one or more computing devices, servers, services, local processes, remote machines, web services, virtual machines (VMs), etc. Second computing device 102 may provide remote content (e.g., content generated outside first computing device 104). Second computing device 102 may comprise, for example, a server located on an organization's premises and/or coupled to an organization's local network, a remotely located server, a cloud-based server (e.g., one or more servers organized in a distributed manner), or any other device or service. For example, second computing device(s) 102 may include a secure cloud server and a computing device providing a VM. Second computing device 102 may execute a plurality of programs. For example, second computing device 102 may be a cloud server hosting one or more websites accessible using one or more uniform resource locators (URLs) or other type of resource indicator. One or more computing devices in second computing device(s) 102 may be secure while other computing devices in second computing device(s) 102 may be unsecure. In some examples, second computing device 102 may host secure content accessible to authorized users. The implementation of second computing device 102 remotely from first computing device 104 enables the use of hardware and/or software inaccessible to first computing device 104 (and to malicious actors associated with first computing device 104) to securely process locally generated pointer operation information, as well as for potentially greater hardware and/or software resources (e.g., cloud resources including servers, virtual machines, etc.) to be applied to process the pointer operation information relative to local, which may enable rapid turnaround of the resultant information used to generate a display in the secure region at first computing device 104.

In some examples, second computing device(s) 102 may be one or more remote computing devices. In some examples, second computing device(s) 102 may be a local computing device (e.g., local to first computing device 104). For example, first and second computing devices 102, 104 may be communicatively coupled together (e.g., wirelessly and/or by wire), such as for cross computer flow and file sharing. In some examples, secure and unsecure windows 142, 144 may be generated by the same computing device, e.g., first computing device 104.

Network(s) 112 may include, for example, one or more of any of a local area network (LAN), a wide area network (WAN), a personal area network (PAN), a combination of communication networks, such as the Internet, and/or a virtual network. As shown by example in FIG. 1, first computing device 104 and second computing device 102 may be communicatively coupled via network(s) 112. In an implementation, computing device 104 and second computing device 102 may communicate via one or more application programming interfaces (APIs), and/or according to other interfaces and/or techniques. Computing device 104 and second computing device 102 may include one or more network interfaces that enable communications between devices.

CPU 122 comprises any type of processor, microcontroller, a microprocessor, signal processor (e.g., digital signal processor (DSP)), application specific integrated circuit (ASIC), and/or other physical hardware processor circuit) for performing computing tasks, such as program execution, signal coding, data processing, input/output processing, power control, and/or other functions. CPU 122 is configured to execute program code, such as an operating system and/or application programs. CPU 122 may perform operations, e.g., based on execution of executable code, which may include one or more steps in processes/methods disclosed herein. CPU 122 may be associated with (e.g., may read and write to) a variety of memory and storage, such as SSD, RAM, ROM, flash memory, MEM, etc.

CPU 122 executes an operating system (OS) 120 and applications as processes. OS 120 and one or more applications executed by CPU 122 may be unsecure, resulting in unsecure windows 144. Processor may execute operating system and/or application instructions to communicate with second computing device(s) 102 through network interface 116. A secure session between secure session unit 114 and a second computing device 102 may generate a secure window 142, which may involve handling by CPU 122 to send and receive information between secure session unit 114, second computing device(s) 102 and secure graphics unit 118 via network interface 116 and network(s) 112.

Network interface 116 may send information to and receive information from second computing device(s) 102 via network(s) 112. Network interface 116 may include one or more wired or wireless, internal and/or external communication interfaces, drivers, switches, etc., such as an IEEE 802.11 wireless LAN (WLAN) wireless interface, a Worldwide Interoperability for Microwave Access (Wi-MAX)

interface, an Ethernet interface, a Universal Serial Bus (USB) interface, a cellular network interface, a Bluetooth™ interface, a near field communication (NFC) interface, liquid crystal display (LCD) driver, an Ethernet switch, etc. Network interface 116 may receive inputs from and drive outputs to internal components and external devices.

For example, network interface 116 receives URLs and user input from input devices 148 to provide to second computing device(s) 102. Interface(s) 116 may send information (e.g., URLs) to second computing device 102 via network(s) 112 and receive remote content from second computing device 102. For example, network interface 116 receives information associated with secure window 142 from second computing device(s) 102 to provide to secure session unit 114 and secure graphics unit 118.

Input device(s) 148 include any type of input device for a computing device, such as a pointer device (e.g., touchpad, mouse, trackball), drawing devices (e.g., sketch pad), a typing/text input device (e.g., keyboard), a touch screen, a joystick, a video game controller, a scanner, a stylus pen, a voice recognition system to receive voice input, a gesture recognition system to receive gesture input, etc. A user may use input devices 148, for example, to interact with unsecure window(s) 144 and secure window 142. A user may use input devices 148, for example, to enter a URL, e.g., to access remote content on second computing device(s) 102. A user may use input devices 148, for example, to start a secure session with secure session unit 114.

Figure 6:
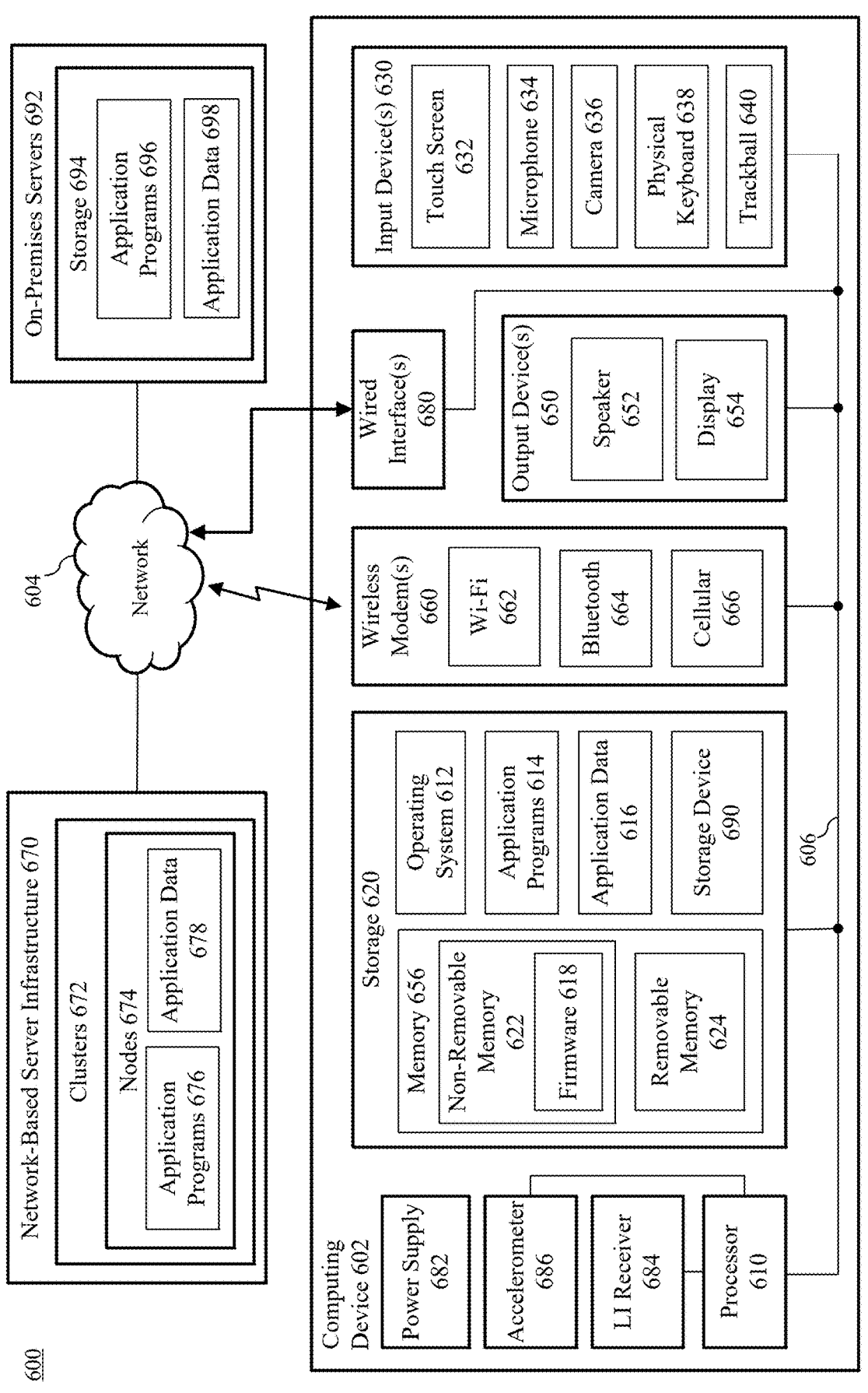
FIG. 6 shows a block diagram of an example computer system in which embodiments may be implemented.

Secure session unit 114 is configured to provide secure computing sessions, for example, with second computing device(s) 102. Secure session 114 may be implemented as a standalone device (e.g., a docking station) or may be integrated, for example, with first computing device 104. Secure session unit 114 may include, for example, a processor, decryptor/encryptor, interface(s), a secure input unit, and an indicator (e.g., see FIG. 2). In an embodiment, secure session unit 114 is implemented in a processing device physically separate from CPU 122 (e.g., secure session unit 114 and CPU 122 may be respectively implemented in separate first and second integrated circuit chips, respectively implemented in separate first and second integrated circuit packages, etc.). FIG. 6, described in further detail below, shows an example of a computing device applicable in whole or in part to a variety of different implementations of secure session unit 114. Secure session unit 114 receives user input from input device(s) 148 relative to secure window 142 and unsecure window(s) 144. As described herein, secure input unit may be configured to provide different treatment of user input for secure window 142 and unsecure window(s) 144.

Secure graphics unit 118 may receive window generating information from one or more sources for unsecure and secure windows. For example, secure graphics unit 118 may receive unsecure window information from CPU 122 executing OS 120 (e.g., and one or more applications) and secure information from second computing device(s) 102, which may be provided (e.g., in encrypted form) to secure graphics unit 118 by CPU 122. Secure graphics unit 118 may generate combined images that combine secure window 143 and unsecure window(s) 144. Secure graphics unit 118 outputs the combined images to display unit 146 for display to a user.

Display unit 146 may be any type of display used in association with computing devices. Display unit 146 may be standalone or integrated with secure device 114. Display unit 146 may be configured to receive a combined image from secure graphics unit 118, which display unit 146 displays for viewing by a user. A combined image includes secure window 142 and unsecure window(s) 144. The example of a displayed combined image shown in FIG. 1 includes secure window 142 with a border overlaid over unsecure window(s) 144. In some examples, unsecure window(s) 144 may be generated by first computing device 104 and secure window 142 may be generated by second computing device(s) 102. Unsecure window(s) 144 may include, for example, a background generated by OS 120 and one or more windows for applications that a user may be using. An unsecure window refers to a window generated outside a secure session without secure components. OS 120 may have access to limited information in secure window 142, such as pointer position to render the cursor. Secure window 142 may be generated in a secure session maintained by secure session unit 114. A secure session may avoid potential security risks associated with first computing device 104, such as a potentially corrupted operating system (OS) 120.

As shown in FIG. 1, secure graphics unit 118 outputs and display unit 146 displays combined image with secure window 142 overlaid over unsecure window(s) 144. A pointer is shown moving right to left or left to right in unsecure window(s) 144 into secure window 142 and back to unsecure window(s) 144. Although the pointer is shown in positions A, B, C, D, E, F, G, H, and I, display unit 146 displays continuous locations of the pointer. Pointer positions A and I are in unsecure window(s) 144 while pointer positions B, C, D, E, F, G, and H are in secure window 142. At position C, for example, a user may use input device(s) 148, such as by clicking a touchpad or mouse to select the secure search bar 150 and typing on a keyboard to enter text in the secure search bar 150.

Secure session unit 114 is configured to treat input received from input device(s) 148 differently depending on which window a user is interacting with—secure window 142 or unsecure window(s) 144. For example, when the pointer is located outside the secure window 142 (e.g., in unsecure window(s) 144), such as at location A or H, secure session unit 114 is configured to generate unencrypted input reports to provide to OS 120 pointer location and user inputs or activities, such as clicks and scrolls. OS 120 processes the unencrypted reports and provides information to secure graphics unit 118 to render the pointer (the displayed pointer graphic), inputs, and activity(ies) on display unit 146. As the pointer location moves into secure window 142, such as from location A to B or from I to H, OS 120 may be configured to report entrance coordinates to secure session unit 114.

While pointer is in secure window 142, secure session unit 120 may conceal/hide the pointer position, user inputs, and user activities from OS 120, for example, by generating encrypted input reports and providing the encrypted input reports to OS 120. Secure session unit 114 may use, for example, homomorphic encryption. OS 120 processes the encrypted pointer information, including encrypted location (e.g., coordinates), inputs and activities, to determine encrypted (e.g., absolute) pointer location, inputs, and activities, and returns the calculated encrypted pointer information to secure session unit 114. OS 120 remains unaware that user moved the pointer to secure search bar 150, clicked on it, and typed in search terms. Secure session unit 114 decrypts the calculated encrypted pointer information (e.g., including encrypted pointer location information) to determine the unencrypted pointer information. Secure session unit 114 provides pointer location information to OS 120 and/or to second computing device(s) 102 to render the pointer on display unit 146. If OS 120 renders the pointer, it may receive limited information, still unaware of user activity and input in secure window 142.

As the pointer location moves out of secure window 142, such as from location B to A or from H to I, OS 120 may be configured to report exit coordinates to secure session unit 114. When the pointer is located outside the secure window 142 (e.g., in unsecure window(s) 144), such as at location A or H, secure session unit 114 is configured to generate unencrypted input reports to provide to OS 120 pointer location and user inputs or activities, such as clicks and scrolls. OS 120 processes the unencrypted reports and provides information to secure graphics unit 118 to render the pointer, inputs, and activity (ies) on display unit 146.

Figure 2:
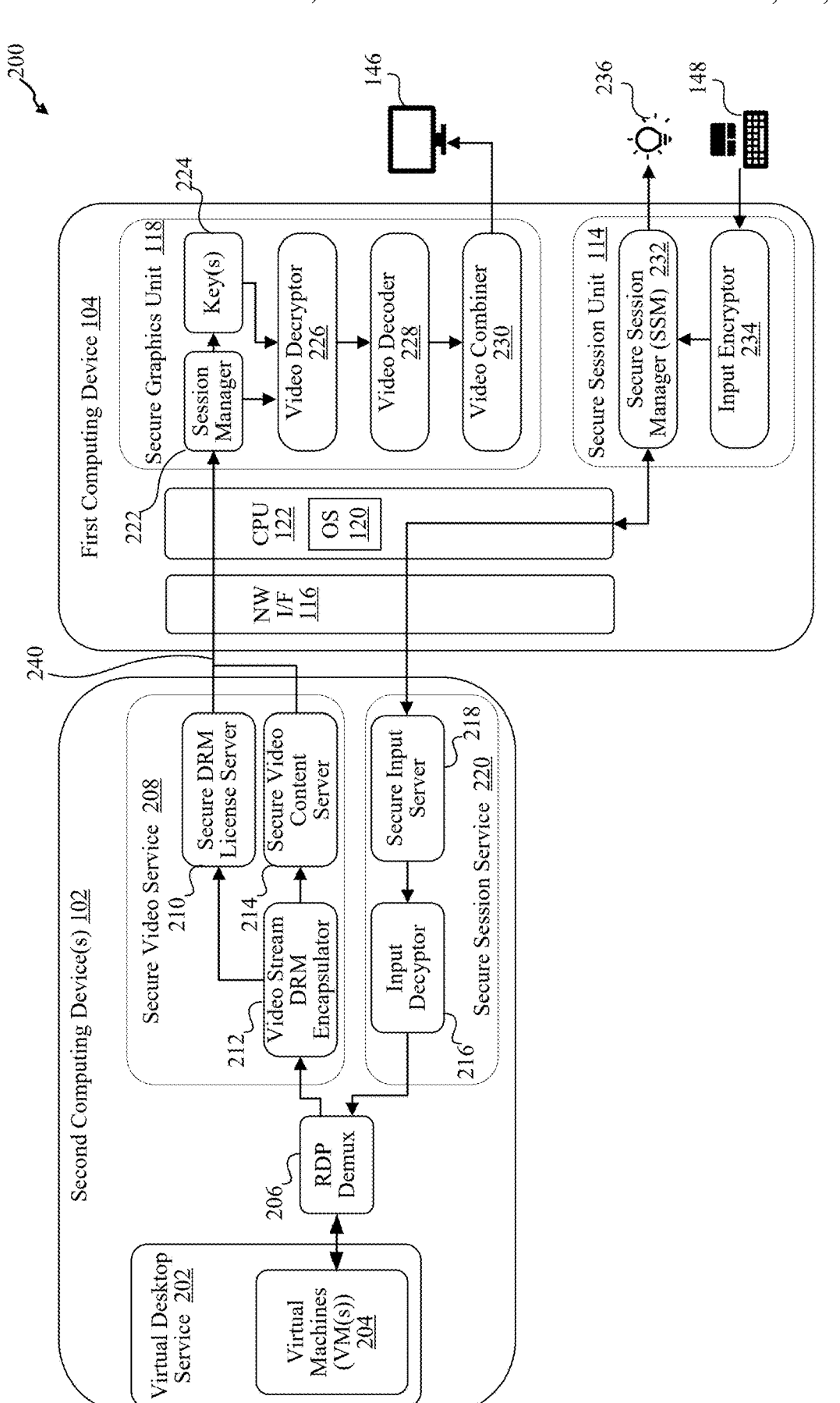
FIG. 2 shows a block diagram of a system configured to provide a seamless and secure cloud to PC pointer relay, in accordance with an embodiment.

FIG. 2 shows a block diagram of a system configured to provide a seamless and secure cloud to PC pointer relay, in accordance with an embodiment. Example system 200 includes first computing device 104 and second computing device 102. Network(s) 112 has been omitted from FIG. 2 for simplification. First computing device 104 includes secure session unit 114 (also referred to herein as a "secure processor"), secure graphics unit 118, CPU 122 and network interface 116. Secure graphics unit 118 includes a session manager 222, one or more keys 224, a video decryptor 226, a video decoder 228, and a video combiner 230. Secure session unit 114 includes a secure session manager (SSM) 232 and an input encryptor 234. Second computing device(s) 102 includes a virtual desktop service 202, a remote desktop protocol demultiplexer (RDP Demux) 206, a secure video service 208, and a secure session service 220. Virtual desktop service 202 includes one or more virtual machines 204. Secure video service 208 includes a secure digital rights management (DRM) license server 210, a video stream DRM encapsulator 212, and a secure video content server 214. Secure session service 220 includes an input decryptor 216 and a secure input server 218. These components of system 100 are described in further detail as follows.

As shown in FIG. 2, first computing device 104 engages in a secure session with second computing device(s) 102, which includes a virtual desktop service 202, e.g., provided by a cloud service. With reference to second computing device(s) 102, secure session service 220 receives secure input from secure session unit 114 in first computing device 104, decrypts the encrypted input, and provides decrypted input to the virtual desktop service 202. Secure video service 208 receives video from the virtual desktop service 202, encrypts the video, and sends the encrypted video to secure graphics unit 118 in first computing device 104 for decryption, combination with unsecure video generated by first computing device 104, and display on display unit 146.

Secure session manager 232 may include a secure session manager application. Secure session unit 114 executes the secure session manager application to implement secure session manager 232. Secure session manager 232, e.g., when executed by the secure processor of secure session unit 114, implements secure communication sessions. A user may select secure session manager 232 or secure session manager 232 may always be active. Secure session manager 232 may implement a remote session (RS) protocol. A user may instigate a secure session, for example, by selecting or entering an address, such as a URL, using input device(s) 148, which may be recognized by secure session manager 232. For example, a user may type in a URL indicating that secure session manager 232 should create a secure session with second computing device 102. Secure session manager 232 creates a secure session. Secure session manager may cause secure session indicator 236 to indicate a secure session. Secure session manager 232 may signal input encryptor 234 to encrypt user input received from input device(s) 148 in a secure session window.

Secure session manager 232 interacts with OS 120 differently for unencrypted user input and encrypted user input. Secure session manager 232 sends unencrypted user input to OS 120 for user input in unsecure window(s) 144. OS 120 processes the unencrypted user input and directs secure graphics unit 118 to render user input in unsecure window(s) 144. Secure session manager 232 sends encrypted user input to OS 120 for user input in secure window 142. OS 120 may process and return encrypted calculated user input to secure session manager 232.

For example, secure session manager 232 receives user input in a secure window in a secure, encrypted format from input encryptor 234. The type of encryption may be, for example, homomorphic encryption. Secure session manager 232 communicates the encrypted user input to OS 120 to perform calculations on the encrypted information. OS 120 returns the encrypted calculated user input to secure session manager 232. Secure session manager 232 decrypts the encrypted calculated user input to determine the calculated user input. Secure session manager 232 communicates the calculated user input to second computing device 102 (e.g., to secure session service 220) via network interface 116 using a secure protocol, such as transport layer security (TLS) that encrypts the calculated user input. Secure session service 220 decrypts the encrypted input and provides it to virtual desktop service 202, which responds by generating a secure window and providing it to secure video service 208. Secure video service 208 encodes and encrypts the secure window as a video stream and provides it as remote content 240 to secure graphics unit 118. Secure graphics unit 118 decrypts and decodes the secure window video stream, and combines it with an unsecure window video stream for display by display unit 146. User interacts with the displayed secure and unsecure video stream displayed on display unit 146 as secure window 142 and unsecure window(s) 144. Input encryptor 234 selectively encrypts user input in the secure window 142.

Secure session indicator 236 indicates when there is a secure session. Secure session indicator 236 may be, for example, a light emitting diode (LED) or a liquid crystal display (LCD). Secure session manager 232 may signal an LED/LCD driver to drive secure session indicator 236 to provide an indication to a user when there is a secure session, and to turn off the indication when the secure session ends.

Input encryptor 234 receives user input from input device(s) 148. Input encryptor 234 selectively encrypts user input in the secure window 142. Input encryptor 234 may not encrypt user input in unsecure window(s) 144. Input encryptor 234 encrypts user input in secure window 142, for example, using homomorphic encryption to preserve the underlying data in cipher text that OS 120 can process to generate useful data while maintaining data confidentiality. Homomorphic encryption enables mathematical operations to be performed on encrypted data by OS 120 without compromising the encryption. In other words, the security of the encrypted data is maintained due to the homomorphic encryption enabling operations to be performed on the encrypted data directly without first having to decrypt the encrypted data. The output of operations performed on the homomorphically encrypted data are left in an encrypted form which, when decrypted, is identical to that produced had the operations been performed on the unencrypted data. Input encryptor 234 may provide user input to secure session manager 232 in different formats (e.g., encrypted or unencrypted), for example, depending on whether the user input is in unsecure window(s) 144 or secure window 142.

Secure graphics unit 118 may implement digital rights management (DRM) hardware. DRM may be implemented, in secure graphics unit 118, such as a GPU, and/or in a system on a chip (SoC). Secure graphics unit 118 is configured to generate secure video for remote content 240 provided by second computing device(s) 102 as secure window 142 combined with (e.g., overlaid over) unsecure window(s) 144.

Session manager 222 in secure graphics unit 118 may include a session manager application. Secure graphics unit 118 may include a processor that executes the session manager application to implement session manager 222. Session manager 222, e.g., when executed by the processor, implements secure video session management operations. Session manager 222 communicates with secure video service 208. For example, session manager 222 communicates with secure digital rights management (DRM) license server 210 and secure video content server 214. Session manager 222 may receive remote content 240 from secure DRM license server 210 and secure video content server 214 via network interface 116. Session manager 222 manages decryption key(s) 224. Session manager 222 provides encrypted remote content 240 and decryption key(s) 224 to video decryptor 226. Decryption key(s) 224 may be provided by secure video service 208, for example, based on established trust, such as user authorization, purchase authorization, confirmation of security information provided by secure graphics unit 118, etc.

Video decryptor 226 receives encrypted video and key(s) 224 from session manager 222. Video decryptor 226 decrypts the encrypted video using key(s) 224. Video decryptor 226 provides the unencrypted, but still encoded, video to video decoder 228.

Video decoder 228 decodes the encoded video received from video decryptor 226, for example, based on encoding performed and signaled by secure video service 208. Video decoder 228 generates decoded video and provides it to video combiner 230.

Video combiner 230 combines the decoded video generated by video decoder 228, which represents secure window 142, with video generated by a GPU or secure graphics unit 118 for unsecure window(s) 144 representing content produced by OS 120 and any applications executed by CPU 122. For example, in response to a secure session, video combiner 230 may overlay secure window 142 within a border over unsecure window(s) 144. Video combiner 230 outputs the combined video to display unit 146 for display to a user.

Secure session service 220 of second computing device 102 interfaces with SSM 232 to receive secure user input for activity in secure window 142. Virtual desktop service 202 processes the user input in secure window 142 and generates video representing secure window 142. Secure video service 208 encodes and encrypts the video representation of secure window 142 and provides it as remote content 240 (e.g., a secure video stream) to secure graphics unit 118.

As shown in FIG. 2, virtual desktop service 202 includes virtual machine(s) (VM(s)) 204 on one or more computing devices, e.g., among other components not shown. Secure video service 208 comprises, for example, video stream DRM encapsulator 212, secure video content server 214, and secure DRM license server 210, e.g., among other components not shown. Secure session service 220 includes, for example, secure input server 218 and input decryptor 216, e.g., among other components not shown.

Secure input server 218 interfaces with SSM 232. Secure input server 218 may handle the negotiation and attestation aspects of a secure session. Secure input server 218 receives encrypted user input information for operations in secure window 142 using input device(s) 148 from SSM 232. Secure input server 218 provides the encrypted user input in secure window 142 to input decryptor 216.

Input decryptor 216 decrypts the encrypted user input in secure window 142 received from secure input server 218 to generate decrypted user input. Input decryptor 216 provides the decrypted user input in secure window 142 to RDP demux 206.

VM(s) 204 generate content for secure window 142. VM(s) 204 may implement, for example, a remote desktop, which may be a virtual desktop, such as a virtual Microsoft Windows desktop environment, on one or more computing devices. A virtual desktop may be implemented, for example, using a remote desktop protocol (RDP) to provide remote display and input capabilities over network connections. A cloud service provider may implement a virtual desktop infrastructure (VDI) that provides a selectable number of VMs to customers, for example, to provide remote desktop computing environments to employees of the customers. A VDI may host desktop environments on a centralized server and deploy them to authorized end-users on request. As described herein, a secure VDI-based cloud session may be implemented even on a compromised edge machine, such as first computing device 104. For example, VM(s) generate encoded video representing secure window 142, including representing user interactions with secure window 142, such as user input using input device(s) 148. VM(s) 204 may encode video representing the secure window 142, for example, using high efficiency video coding (HEVC), such as H.264 or H.265. VM(s) 204 signals decoding information to video decoder 228 to decode decrypted remote content 240 into the secure window video generated by VM(s) 204. VM(s) 204 provide the encoded secure window video to RDP demux 206.

RDP demux 206 selectively provides decrypted user input in secure window 142 received from input decryptor 216 to VM(s) 204 and provides encoded secure window video generated by VM(s) 204 to video stream DRM encapsulator 212.

Video stream DRM encapsulator 212 encapsulates the encoded secure window video generated by VM(s) 204 into a video stream.

Secure video content server 214 receives the encapsulated, encoded video stream from video stream DRM encapsulator 212. Secure video content server 214 encrypts the encoded video stream using a key generated and provided by secure DRM license server 210. Secure video content server 214 provides the encrypted, encapsulated, encoded video stream representing secure window 142 as remote content 240 to session manager 222.

Secure DRM license server 210 manages digital rights to content served by secure video content server 214. Secure DRM license server 210 interfaces with session manager 222. Secure DRM license server 210 may provide session manager 222 with key(s) 224 to decrypt remote content 240, for example, based on user authorization, purchase authorization, confirmation of security information provided by secure graphics unit 118, etc.

Figures 3A, 3B:
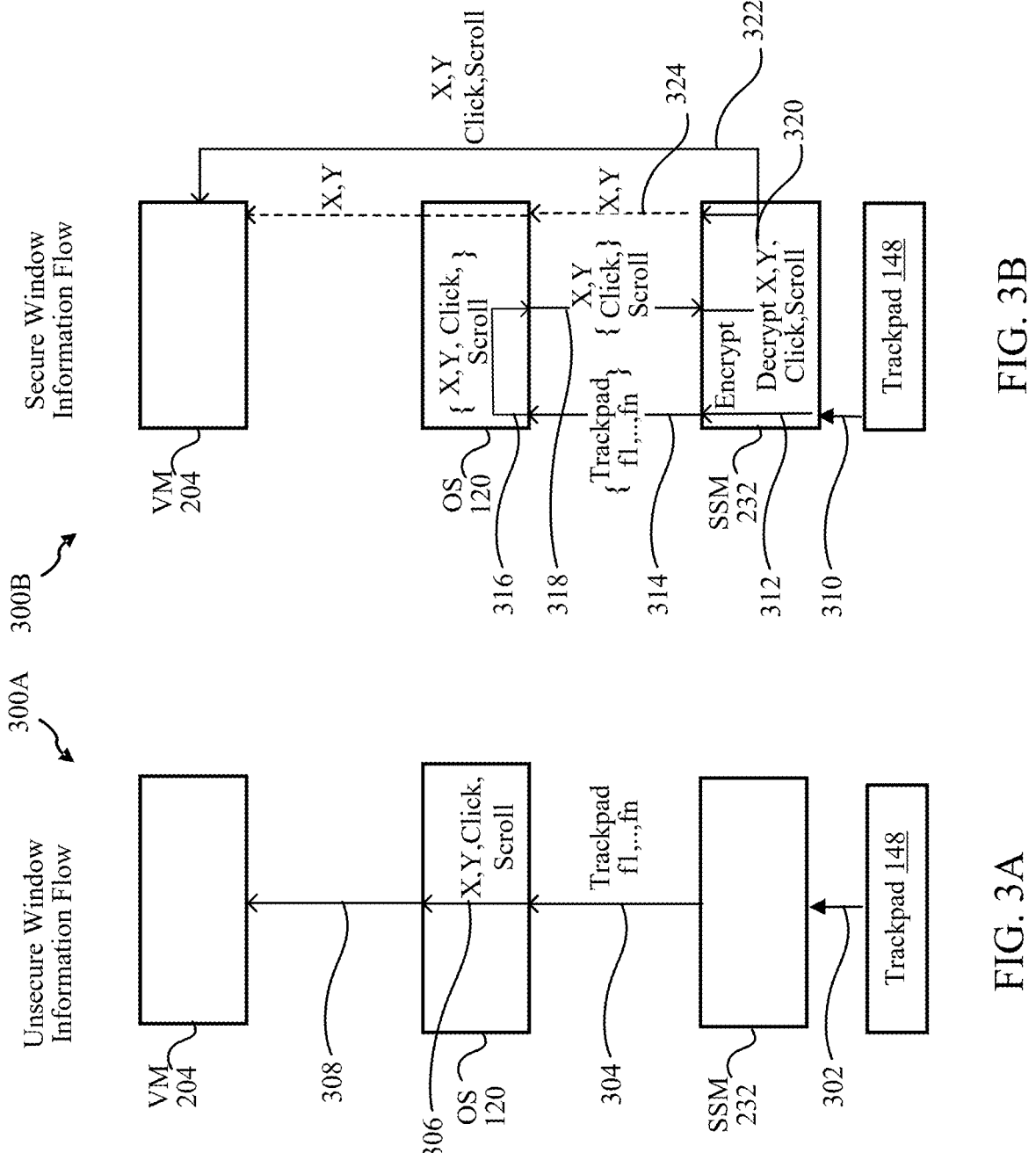
FIG. 3A shows a block diagram of unsecure data flow, in accordance with an embodiment.
FIG. 3B shows a block diagram of secure data flow, in accordance with an embodiment.

Embodiments described herein may operate in various ways. For instance, FIG. 3A shows a block diagram of unsecure data flowchart 300A, in accordance with an embodiment. Example computing system 100 and 200, as shown by examples in FIGS. 1 and 2, may operate according to flowchart 300A, e.g., in some embodiments. For example, example flowchart 300A may be implemented by first computing device 104. Various embodiments may implement one or more steps shown in FIG. 3A with additional and/or alternative steps. Further structural and operational embodiments will be apparent to persons skilled in the relevant art(s) based on the following description of FIG. 3A.

Flowchart 300A includes step 302. In step 302, trackpad pointing device 148 sends user input in unsecure window(s) 144 to secure session unit (SSU) 114.

In step 304, SSU 114 sends trackpad events in unsecure window(s) 144 (e.g., Trackpad f1, . . . fn) to OS 120.

In step 306, OS 120 performs calculations on the trackpad events Trackpad f1, . . . fn. For example, OS 120 may calculate absolute positions of the pointer using relative position information in the trackpad events. OS 120 generates X, Y position data, and user operations, such as clicking and scrolling at various locations as X, Y, click, scroll.

In step 308, OS 120 may (e.g., optionally) provide the X,Y, click, scroll data to VM 204, for example, if VM 204 is generating unsecure window(s) 144.

FIG. 3B shows a block diagram of secure data flowchart 300B, in accordance with an embodiment. Example computing system 100 and 200, as shown by examples in FIGS. 1 and 2, may operate according to flowchart 300B, e.g., in some embodiments. For example, example flowchart 300B may be implemented by first computing device 104 and second computing device(s) 102. Various embodiments may implement one or more steps shown in FIG. 3B with additional and/or alternative steps. Further structural and operational embodiments will be apparent to persons skilled in the relevant art(s) based on the following description of FIG. 3B.

Flowchart 300B includes step 310. In step 310, trackpad pointing device 148 sends user input in secure window 142 to secure session unit (SSU) 114.

In step 312, SSU 114 encrypts trackpad events in secure window 142 as {Trackpad f1, . . . fn}, for example, using homomorphic encryption.

In step 314, SSU 114 sends encrypted trackpad events {Trackpad f1, . . . fn} in secure window 142 to OS 120.

In step 316, OS 120 performs calculations on the encrypted trackpad events {Trackpad f1, . . . fn}. For example, OS 120 may calculate absolute positions of the pointer using encrypted relative position information in the trackpad events {Trackpad f1, . . . fn}. OS 120 generates encrypted X,Y position data, and user operations, such as clicking and scrolling at various encrypted X, Y positions as {X, Y, click, scroll}.

In step 318, OS 120 sends the encrypted pointer position and operation information {X,Y, click, scroll} to SSU 114.

In step 320, SSU 114 decrypts the encrypted pointer position and operation information {X,Y, click, scroll} to determine the unencrypted pointer position and operation information X,Y, click, scroll.

In step 322, SSU 114 sends the unencrypted pointer position and operation information X,Y, click, scroll to VM 204, e.g., using a secure data transfer protocol between SSU 114 and secure session service 220.

In step 324, SSU 114 may (e.g., optionally) send X,Y pointer position information to OS 120 to have the host (e.g., first computing device 104) locally render the pointer in secure window 142 displayed on display unit 146, as opposed to having VM 204 render the pointer in secure window 142. OS 120 may be given pointer position information for host cursor rendering without revealing pointer events, such as clicking and scrolling events.

Figure 4:
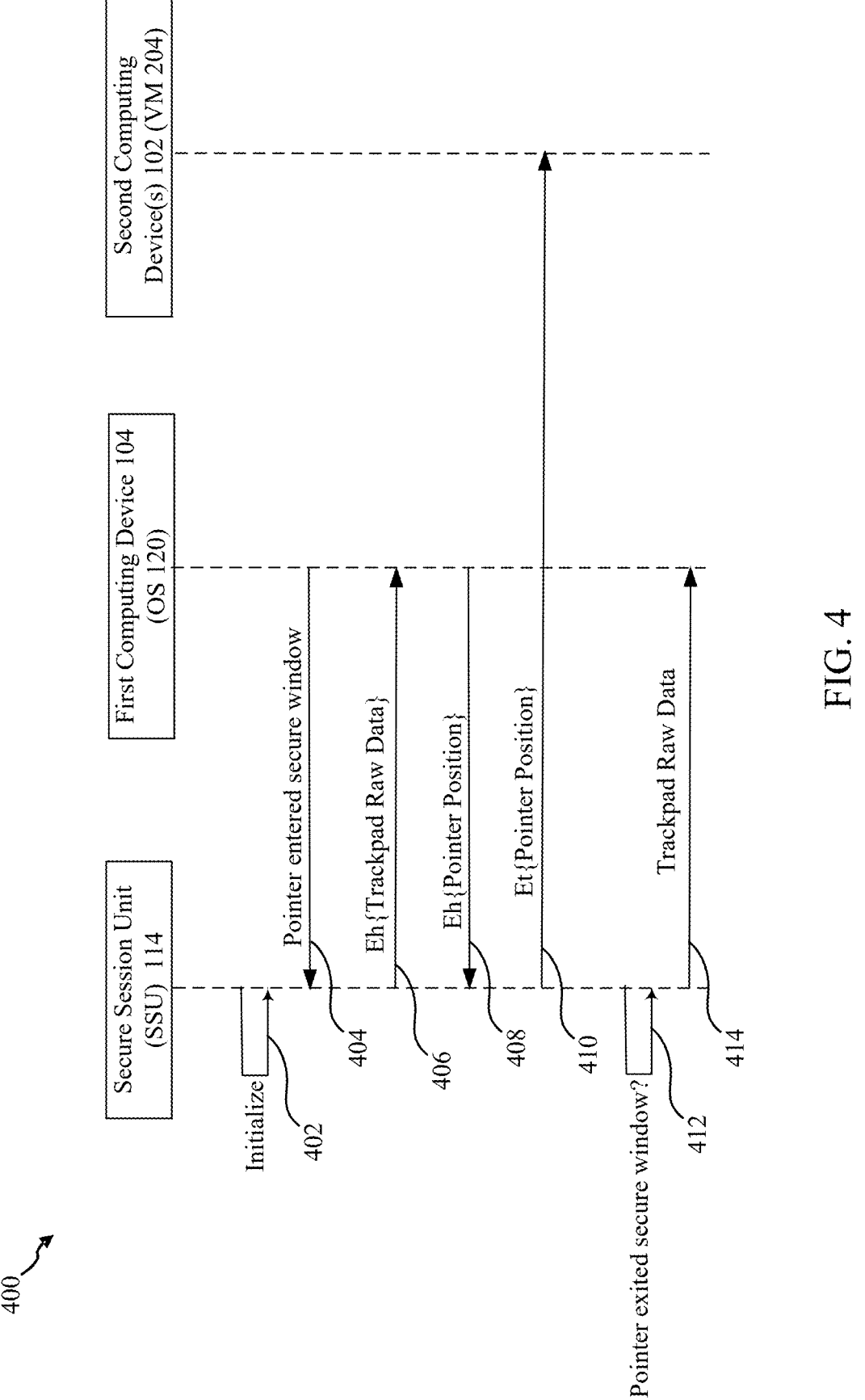
FIG. 4 shows an interaction diagram for unsecure and secure data flow, according to an embodiment.

FIG. 4 shows an interaction diagram 400 for unsecure and secure data flow, according to an embodiment. Interaction diagram 400 shows an example of interaction between secure session unit 114, OS 120, and VM 204. Example computing system 100 and 200, as shown by examples in FIGS. 1 and 2, may operate according to interaction diagram 400, e.g., in some embodiments. For example, example interaction diagram 400 may be implemented by first computing device 104 and second computing device(s) 102. Various embodiments may implement one or more steps shown in FIG. 4 with additional and/or alternative steps. Further structural and operational embodiments will be apparent to persons skilled in the relevant art(s) based on the following description of FIG. 4.

Interaction diagram 400 includes step 402. In step 402, SSU 114 may initialize, for example, to load a configuration.

In step 404, OS 120 indicates to SSU 114 that a trackpad pointer entered secure window 142, which SSU 114 uses to enter secure mode.

In step 406, SSU 114 provides encrypted trackpad raw data, e.g., including encrypted relative pointer position data, to OS 120 to perform calculations. The encryption (E) may be performed using homomorphic (h) encryption (Eh).

In step 408, OS 120 calculates encrypted pointer data (e.g., still in homomorphic encryption), including encrypted absolute pointer position pointer data, and returns the encrypted calculated pointer data to SSU 114.

In step 410, SSU 114 decrypts the homomorphically encrypted calculated pointer data to determine the calculated pointer data, encrypts the calculated pointer data indicated as Et { }, and provides the encrypted calculated pointer data to VM 204. SSU 114 may send the calculated pointer data to VM 204 over an encrypted channel, such as transport layer security (TLS)).

Steps 404 through 410 repeat until the loop in step 412 indicates the pointer is outside secure window 142.

In step 412, SSU 114 executes a loop to determine whether the trackpad pointer exited secure window 142.

In step 414, the pointer having exited secure window 142, causes SSU 114 to return to providing trackpad raw (e.g., unencrypted) data to OS 120 for trackpad operations in unsecure window(s) 144.

FIG. 5 shows a flowchart 500 of a process for seamless and secure cloud to PC pointer relay, according to an embodiment. Example computing system 100 and 200, as shown by examples in FIGS. 1 and 2, may operate according to flowchart 500, e.g., in some embodiments. For example, example flowchart 500 may be implemented by first computing device 104 or SSU 114. Various embodiments may implement one or more steps shown in FIG. 5 with additional and/or alternative steps. Further structural and operational embodiments will be apparent to persons skilled in the relevant art(s) based on the following description of FIG. 5.

Flowchart 500 includes step 502. In step 502, pointing device information generated by pointing device operation in a secure window and an unsecure window displayed by a display unit may be received. For example, as shown in FIGS. 1 and 2, pointing device information may be received by secure session unit 114 from input device(s) 148 as the pointer moves through positions A through I across unsecure window(s) 144 and secure window 142 performing operations.

In step 504, pointing device reports may be sent to an operating system (OS) for the pointing device operation in the unsecure window to render the pointer in the unsecure window. For example, as shown in FIGS. 1, 2 and 3A, SSM 232 sends raw trackpad reports to OS 120 for pointing device at locations A and I in unsecure window(s) 144 to render the pointer at locations A and I on display unit 146.

In step 506, encrypted pointing device reports may be sent to the OS for the pointing device operation in the secure window to conceal the pointing device operation in the secure window from the OS. For example, as shown in FIGS. 1, 2 and 3B and 4, SSM 232 in SSU 114 sends encrypted trackpad reports to OS 120 for pointing device at locations B through H in secure window 142.

In step 508, encrypted calculated pointing device information may be received from the OS responsive to the encrypted pointing device reports. For example, as shown in FIGS. 1, 2 and 3B and 4, SSM 232 in SSU 114 receives encrypted calculated pointing device information (e.g., {X, Y, click, scroll}) from OS 120.

In step 510, the encrypted calculated pointing device information may be decrypted to determine calculated pointing device information for pointer device operations in the secure window. For example, as shown in FIGS. 1, 2 and 3B and 4, SSM 232 in SSU 114 decrypts encrypted calculated pointing device information to determine calculated pointing device information (e.g., X, Y, click, scroll).

In step 512, the calculated pointing device information may be sent to at least one of the operating system or to a computing source of the secure window to render the pointer in the secure window. For example, as shown in FIGS. 1, 2 and 3B and 4, SSM 232 in SSU 114 sends the calculated pointing device information (e.g., X, Y, click, scroll) to VM 204 and/or OS 120 to render the pointer in the secure window 142.

III. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including being implemented as computer program code (program instructions) configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 6. FIG. 6 shows a block diagram of an exemplary computing environment 600 that includes a computing device 602. Computing device 602 is an example of first computing device 104 and second computing device 102 shown in FIGS. 1 and 2, which may each include one or more of the components of computing device 602. In some embodiments, computing device 602 is communicatively coupled with devices (not shown in FIG.

6) external to computing environment 600 via network 604. Network 604 comprises one or more networks such as local area networks (LANs), wide area networks (WANs), enterprise networks, the Internet, etc., and may include one or more wired and/or wireless portions. Network 604 may additionally or alternatively include a cellular network for cellular communications. Computing device 602 is described in detail as follows.

Computing device 602 can be any of a variety of types of computing devices. For example, computing device 602 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 602 may alternatively be a stationary computing device such as a desktop computer, a personal computer (PC), a stationary server device, a minicomputer, a mainframe, a supercomputer, etc.

As shown in FIG. 6, computing device 602 includes a variety of hardware and software components, including a processor 610, a storage 620, one or more input devices 630, one or more output devices 650, one or more wireless modems 660, one or more wired interfaces 680, a power supply 682, a location information (LI) receiver 684, and an accelerometer 686. Storage 620 includes memory 656, which includes non-removable memory 622 and removable memory 624, and a storage device 690. Storage 620 also stores an operating system 612, application programs 614, and application data 616. Wireless modem(s) 660 include a Wi-Fi modem 662, a Bluetooth modem 664, and a cellular modem 666. Output device(s) 650 includes a speaker 652 and a display 654. Input device(s) 630 includes a touch screen 632, a microphone 634, a camera 636, a physical keyboard 638, and a trackball 640. Not all components of computing device 602 shown in FIG. 6 are present in all embodiments, additional components not shown may be present, and any combination of the components may be present in a particular embodiment. These components of computing device 602 are described as follows.

A single processor 610 (e.g., central processing unit (CPU), microcontroller, a microprocessor, signal processor, ASIC (application specific integrated circuit), and/or other physical hardware processor circuit) or multiple processors 610 may be present in computing device 602 for performing such tasks as program execution, signal coding, data processing, input/output processing, power control, and/or other functions. Processor 610 may be a single-core or multi-core processor, and each processor core may be single-threaded or multithreaded (to provide multiple threads of execution concurrently). Processor 610 is configured to execute program code stored in a computer readable medium, such as program code of operating system 612 and application programs 614 stored in storage 620. The program code is structured to cause processor 610 to perform operations, including the processes/methods disclosed herein. Operating system 612 controls the allocation and usage of the components of computing device 602 and provides support for one or more application programs 614 (also referred to as "applications" or "apps"). Application programs 614 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 610 may include one or more general processors (e.g., CPUs) configured with or coupled to one or more hardware accelerators, such as one or more NPUs and/or one or more GPUs.

Any component in computing device 602 can communicate with any other component according to function, although not all connections are shown for ease of illustration. For instance, as shown in FIG. 6, bus 606 is a multiple signal line communication medium (e.g., conductive traces in silicon, metal traces along a motherboard, wires, etc.) that may be present to communicatively couple processor 610 to various other components of computing device 602, although in other embodiments, an alternative bus, further buses, and/or one or more individual signal lines may be present to communicatively couple components. Bus 606 represents one or more of any of several types of bus structures, including a memory bus or memory controller, a peripheral bus, an accelerated graphics port, and a processor or local bus using any of a variety of bus architectures.

Storage 620 is physical storage that includes one or both of memory 656 and storage device 690, which store operating system 612, application programs 614, and application data 616 according to any distribution. Non-removable memory 622 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 622 may include main memory and may be separate from or fabricated in a same integrated circuit as processor 610. As shown in FIG. 6, non-removable memory 622 stores firmware 618, which may be present to provide low-level control of hardware. Examples of firmware 618 include BIOS (Basic Input/Output System, such as on personal computers) and boot firmware (e.g., on smart phones). Removable memory 624 may be inserted into a receptacle of or otherwise coupled to computing device 602 and can be removed by a user from computing device 602. Removable memory 624 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 690 may be present that are internal and/or external to a housing of computing device 602 and may or may not be removable. Examples of storage device 690 include a hard disk drive, a SSD, a thumb drive (e.g., a USB (Universal Serial Bus) flash drive), or other physical storage device.

One or more programs may be stored in storage 620. Such programs include operating system 612, one or more application programs 614, and other program modules and program data. Examples of such application programs may include, for example, computer program logic (e.g., computer program code/instructions) for implementing video stream DRM encapsulator 212, session manager 222, video decryptor 226, video decoder 228, video combiner 230, secure session manager 232, input encryptor 234, as well as any of flowcharts or interaction diagrams 300A, 300B, 400, 500, and/or any individual steps thereof.

Storage 620 also stores data used and/or generated by operating system 612 and application programs 614 as application data 616. Examples of application data 616 include web pages, text, images, tables, sound files, video data, and other data, which may also be sent to and/or received from one or more network servers or other devices via one or more wired or wireless networks. Storage 620 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 602 through one or more input devices 630 and may receive information from computing device 602 through one or more output devices 650. Input device(s) 630 may include one or more of touch screen 632, microphone 634, camera 636, physical keyboard 638 and/or trackball 640 and output device(s) 650 may include one or more of speaker 652 and display 654. Each of input device(s) 630 and output device(s) 650 may be integral to computing device 602 (e.g., built into a housing of computing device 602) or external to computing device 602 (e.g., communicatively coupled wired or wirelessly to computing device 602 via wired interface(s) 680 and/or wireless modem(s) 660). Further input devices 630 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 654 may display information, as well as operating as touch screen 632 by receiving user commands and/or other information (e.g., by touch, finger gestures, virtual keyboard, etc.) as a user interface. Any number of each type of input device(s) 630 and output device(s) 650 may be present, including multiple microphones 634, multiple cameras 636, multiple speakers 652, and/or multiple displays 654.

One or more wireless modems 660 can be coupled to antenna(s) (not shown) of computing device 602 and can support two-way communications between processor 610 and devices external to computing device 602 through network 604, as would be understood to persons skilled in the relevant art(s). Wireless modem 660 is shown generically and can include a cellular modem 666 for communicating with one or more cellular networks, such as a GSM network for data and voice communications within a single cellular network, between cellular networks, or between the mobile device and a public switched telephone network (PSTN). Wireless modem 660 may also or alternatively include other radio-based modem types, such as a Bluetooth modem 664 (also referred to as a "Bluetooth device") and/or Wi-Fi modem 662 (also referred to as an "wireless adaptor"). Wi-Fi modem 662 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 664 is configured to communicate with another Bluetooth-capable device according to the Bluetooth short-range wireless technology standard(s) such as IEEE 802.15.1 and/or managed by the Bluetooth Special Interest Group (SIG).

Computing device 602 can further include power supply 682, LI receiver 684, accelerometer 686, and/or one or more wired interfaces 680. Example wired interfaces 680 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 680 of computing device 602 provide for wired connections between computing device 602 and network 604, or between computing device 602 and one or more devices/peripherals when such devices/peripherals are external to computing device 602 (e.g., a pointing device, display 654, speaker 652, camera 636, physical keyboard 638, etc.). Power supply 682 is configured to supply power to each of the components of computing device 602 and may receive power from a battery internal to computing device 602, and/or from a power cord plugged into a power port of computing device 602 (e.g., a USB port, an A/C power port). LI receiver 684 may be used for location determination of computing device 602 and may include a satellite navigation receiver such as a Global Positioning System (GPS) receiver or may include other type of location determiner configured to determine location of computing device 602 based on received information (e.g., using cell tower triangulation, etc.). Accelerometer 686 may be present to determine an orientation of computing device 602.

Note that the illustrated components of computing device 602 are not required or all-inclusive, and fewer or greater numbers of components may be present as would be recognized by one skilled in the art. For example, computing device 602 may also include one or more of a gyroscope, barometer, proximity sensor, ambient light sensor, digital compass, etc. Processor 610 and memory 656 may be co-located in a same semiconductor device package, such as being included together in an integrated circuit chip, FPGA, or system-on-chip (SOC), optionally along with further components of computing device 602.

In embodiments, computing device 602 is configured to implement any of the above-described features of flowcharts herein. Computer program logic for performing any of the operations, steps, and/or functions described herein may be stored in storage 620 and executed by processor 610.

In some embodiments, server infrastructure 670 may be present in computing environment 600 and may be communicatively coupled with computing device 602 via network 604. Server infrastructure 670, when present, may be a network-accessible server set (e.g., a cloud-based environment or platform). As shown in FIG. 6, server infrastructure 670 includes clusters 672. Each of clusters 672 may comprise a group of one or more compute nodes and/or a group of one or more storage nodes. For example, as shown in FIG. 6, cluster 672 includes nodes 674. Each of nodes 674 are accessible via network 604 (e.g., in a "cloud-based" embodiment) to build, deploy, and manage applications and services. Any of nodes 674 may be a storage node that comprises a plurality of physical storage disks, SSDs, and/or other physical storage devices that are accessible via network 604 and are configured to store data associated with the applications and services managed by nodes 674. For example, as shown in FIG. 6, nodes 674 may store application data 678.

Each of nodes 674 may, as a compute node, comprise one or more server computers, server systems, and/or computing devices. For instance, a node 674 may include one or more of the components of computing device 602 disclosed herein. Each of nodes 674 may be configured to execute one or more software applications (or "applications") and/or services and/or manage hardware resources (e.g., processors, memory, etc.), which may be utilized by users (e.g., customers) of the network-accessible server set. For example, as shown in FIG. 6, nodes 674 may operate application programs 676. In an implementation, a node of nodes 674 may operate or comprise one or more virtual machines, with each virtual machine emulating a system architecture (e.g., an operating system), in an isolated manner, upon which applications such as application programs 676 may be executed.

In an embodiment, one or more of clusters 672 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 672 may be a datacenter in a distributed collection of datacenters. In embodiments, exemplary computing environment 600 comprises part of a cloud-based platform.

In an embodiment, computing device 602 may access application programs 676 for execution in any manner, such as by a client application and/or a browser at computing device 602.

For purposes of network (e.g., cloud) backup and data security, computing device 602 may additionally and/or alternatively synchronize copies of application programs 614 and/or application data 616 to be stored at network-based server infrastructure 670 as application programs 676 and/or application data 678. For instance, operating system 612 and/or application programs 614 may include a file hosting service client configured to synchronize applications and/or data stored in storage 620 at network-based server infrastructure 670.

In some embodiments, on-premises servers 692 may be present in computing environment 600 and may be communicatively coupled with computing device 602 via network 604. On-premises servers 692, when present, are hosted within an organization's infrastructure and, in many cases, physically onsite of a facility of that organization. On-premises servers 692 are controlled, administered, and maintained by IT (Information Technology) personnel of the organization or an IT partner to the organization. Application data 698 may be shared by on-premises servers 692 between computing devices of the organization, including computing device 602 (when part of an organization) through a local network of the organization, and/or through further networks accessible to the organization (including the Internet). Furthermore, on-premises servers 692 may serve applications such as application programs 696 to the computing devices of the organization, including computing device 602. Accordingly, on-premises servers 692 may include storage 694 (which includes one or more physical storage devices such as storage disks and/or SSDs) for storage of application programs 696 and application data 698 and may include one or more processors for execution of application programs 696. Still further, computing device 602 may be configured to synchronize copies of application programs 614 and/or application data 616 for backup storage at on-premises servers 692 as application programs 696 and/or application data 698.

Embodiments described herein may be implemented in one or more of computing device 602, network-based server infrastructure 670, and on-premises servers 692. For example, in some embodiments, computing device 602 may be used to implement systems, clients, or devices, or components/subcomponents thereof, disclosed elsewhere herein. In other embodiments, a combination of computing device 602, network-based server infrastructure 670, and/or on-premises servers 692 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (micro-electronic machine) memory, nanotechnology-based storage devices, and further types of physical/tangible hardware storage media of storage 620. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 614) may be stored in storage 620. Such computer programs may also be received via wired interface(s) 680 and/or wireless modem(s) 660 over network 604. Such computer programs, when executed or loaded by an application, enable computing device 602 to implement features of embodiments discussed herein. Accordingly, such computer programs represent controllers of the computing device 602.

Embodiments are also directed to computer program products comprising computer code or instructions stored on any computer-readable medium or computer-readable storage medium. Such computer program products include the physical storage of storage 620 as well as further physical storage types.

V. Additional Example Embodiments

Systems and methods are disclosed herein for seamless and secure cloud to PC pointer relay. A pointer/cursor can be moved between secure and unsecure windows while being displayed with smooth transitions and while transitioning between secure and unsecure data handling for pointer information. A secure input unit encrypts pointing device operations in the secure window. A user (host) computing device performs location calculations on encrypted data, which conceals pointing device operations in the secure window from the host operating system. The secure unit decrypts the encrypted data returned by the host operating system to determine the calculated pointer location information. The secure unit relays the calculated pointer operation information to the source of the secure window (e.g., remote cloud server) to process user interaction with the secure window while keeping the host operating system unaware of user activity in the secure window (e.g., other than position, if the host renders the pointer).

In examples, a computing device may be configured to support a seamless and secure cloud to PC pointer relay. A computing device includes a central processing unit (CPU), a graphics unit (e.g., GPU), a display unit, and an input unit. The CPU is configured to execute an operating system. The graphics unit is configured to generate a combined image comprising a secure window generated by a secure processor (e.g., in the computing device or another computing device) and an unsecure window generated by the CPU. The display unit is configured to display the combined image. The input unit is configured to receive pointing device (e.g., trackpad/mouse) information (e.g., pointer location, selection/click, scroll operations) generated by pointing device operation in the secure window and the unsecure window displayed by the display unit. Whether the pointing device information is captured inside the unsecure window or inside the secure window determines whether the input unit sends encrypted or unencrypted pointing device information to the OS. The input unit is configured to send pointing device reports (e.g., with relative location information) to the OS for pointing device operation in the unsecure window to render the pointer in the unsecure window. The input unit is configured to send encrypted pointing device reports to the OS for the pointing device operation in the secure window to conceal the pointing device operation in the secure window from the OS. The input unit is configured to receive encrypted calculated (e.g., absolute position) pointing device information from the OS responsive to the encrypted pointing device reports. The input unit is configured to decrypt the encrypted calculated pointing device information to determine calculated pointing device information for pointer device operations in the secure window. The input unit is configured to send the calculated pointing device information to at least one of the operating system or to the secure processor to render the pointer in the secure window.

In examples, the input unit may be configured to send the calculated pointing device operation information in the secure window to the secure processor to perform the rendering of the pointer in the secure window.

In examples the input unit may be configured to send the calculated pointing device operation information in the secure window to the OS to perform the rendering of the pointer in the secure window.

In examples, the pointing device operation information in the secure window may comprise pointer location coordinates, selection events, and scroll events.

In examples, the input unit may be further configured to encrypt information in the encrypted pointing device reports using homomorphic encryption; and decrypt the encrypted calculated pointing device operation information using homomorphic decryption.

In examples, the input unit may be further configured to receive indications from the OS responsive to the pointing device entering and exiting the secure window.

In examples, the secure processor may be in a remote computing device.

In examples, the remote computing device may comprise a virtual machine.

In examples, a method may comprise receiving pointing device information generated by pointing device operation in a secure window and an unsecure window displayed by a display unit; send pointing device reports to an operating system (OS) for the pointing device operation in the unsecure window to render the pointer in the unsecure window; send encrypted pointing device reports to the OS for the pointing device operation in the secure window to conceal the pointing device operation in the secure window from the OS; receive encrypted calculated pointing device information from the OS responsive to the encrypted pointing device reports; decrypt the encrypted calculated pointing device information to determine calculated pointing device information for pointer device operations in the secure window; and send the calculated pointing device information to at least one of the operating system or to a computing source of the secure window to render the pointer in the secure window.

In examples, the sending of the calculated pointing device operation information in the secure window may comprise sending the calculated pointing device operation information in the secure window to the computing source of the secure window to perform the rendering of the pointer in the secure window.

In examples, the sending of the calculated pointing device operation information in the secure window may comprise sending the calculated pointing device operation information in the secure window to the OS to perform the rendering of the pointer in the secure window.

In examples, the pointing device operation information in the secure window may comprise pointer location coordinates, selection events, and scroll events.

In examples, the method may further comprise encrypting information in the encrypted pointing device reports using homomorphic encryption; and decrypting the encrypted calculated pointing device operation information using homomorphic decryption.

In examples, the method may further comprise receiving indications from the OS responsive to the pointing device entering and exiting the secure window.

In examples, a computer-readable storage device may have instructions recorded thereon that, when executed by a processor, implement a method. The method may comprise receiving pointing device information generated by pointing device operation in a secure window and an unsecure window displayed by a display unit; sending pointing device reports to an operating system (OS) for the pointing device operation in the unsecure window to render the pointer in the unsecure window; sending encrypted pointing device reports to the OS for the pointing device operation in the secure window to conceal the pointing device operation in the secure window from the OS; receiving encrypted calculated pointing device information from the OS responsive to the encrypted pointing device reports; decrypting the encrypted calculated pointing device information to determine calculated pointing device information for pointer device operations in the secure window; and sending the calculated pointing device information to at least one of the operating system or to a computing source of the secure window to render the pointer in the secure window.

In examples, the sending of the calculated pointing device operation information in the secure window may comprise sending the calculated pointing device operation information in the secure window to the computing source of the secure window to perform the rendering of the pointer in the secure window.

In examples, the sending of the calculated pointing device operation information in the secure window may comprise sending the calculated pointing device operation information in the secure window to the computing source of the secure window to perform the rendering of the pointer in the secure window.

In examples, the sending of the calculated pointing device operation information in the secure window may comprise sending the calculated pointing device operation information in the secure window to the OS to perform the rendering of the pointer in the secure window.

In examples, the pointing device operation information in the secure window may comprise pointer location coordinates, selection events, and scroll events.

In examples, the method may further comprise encrypting information in the encrypted pointing device reports using homomorphic encryption; and decrypting the encrypted calculated pointing device operation information using homomorphic decryption.

VI. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (e.g., or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (e.g., computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A computing device comprising:
a central processing unit (CPU) configured to execute an operating system (OS);
a graphics unit configured to generate a combined image comprising a secure window generated by a secure processor and an unsecure window generated by the CPU;
a display unit configured to display the combined image;
an input unit configured to:
receive pointing device information generated by pointing device operation in the secure window and the unsecure window displayed by the display unit;
send pointing device reports to the OS for pointing device operation in the unsecure window to render the pointer in the unsecure window;
send encrypted pointing device reports to the OS for the pointing device operation in the secure window to conceal the pointing device operation in the secure window from the OS, the OS configured to perform calculations on the encrypted pointing device reports to generate encrypted calculated pointing device information in a manner such that the OS is unaware of user activity in the secure window;
receive the encrypted calculated pointing device information from the OS responsive to the encrypted pointing device reports;
decrypt the encrypted calculated pointing device information to determine calculated pointing device information for pointing device operations in the secure window; and
send the calculated pointing device information to at least one of the OS or to the secure processor to render the pointer in the secure window.

2. The computing device of claim 1, wherein the input unit is configured to send the calculated pointing device operation information to the secure processor to perform the rendering of the pointer in the secure window.

3. The computing device of claim 1, wherein the input unit is configured to send the calculated pointing device operation information to the OS to perform the rendering of the pointer in the secure window.

4. The computing device of claim 1, wherein the pointing device operation information in the secure window comprises pointer location coordinates, selection events, and scroll events.

5. The computing device of claim 1, wherein the input unit is further configured to:
encrypt information in the encrypted pointing device reports using homomorphic encryption; and
decrypt the encrypted calculated pointing device operation information using homomorphic decryption.

6. The computing device of claim 1, wherein the input unit is further configured to:
receive indications from the OS responsive to the pointing device entering and exiting the secure window.

7. The computing device of claim 1, wherein the secure processor is in a remote computing device.

8. The computing device of claim 7, wherein the remote computing device comprises a virtual machine.

9. A method, comprising:
receiving pointing device information generated by pointing device operation in a secure window and an unsecure window displayed by a display unit;
sending pointing device reports to an operating system (OS) for the pointing device operation in the unsecure window to render the pointer in the unsecure window;
sending encrypted pointing device reports to the OS for the pointing device operation in the secure window to conceal the pointing device operation in the secure window from the OS, the OS configured to perform calculations on the encrypted pointing device reports to generate encrypted calculated pointing device information in a manner such that the OS is unaware of user activity in the secure window;
receiving the encrypted calculated pointing device information from the OS responsive to the encrypted pointing device reports;
decrypting the encrypted calculated pointing device information to determine calculated pointing device information for pointing device operations in the secure window; and
sending the calculated pointing device information to at least one of the OS or to a computing source of the secure window to render the pointer in the secure window.

10. The method of claim 9, wherein the sending of the calculated pointing device operation information comprises sending the calculated pointing device operation information in the secure window to the computing source of the secure window to perform the rendering of the pointer in the secure window.

11. The method of claim 9, wherein the sending of the calculated pointing device operation information comprises sending the calculated pointing device operation information in the secure window to the OS to perform the rendering of the pointer in the secure window.

12. The method of claim 9, wherein the pointing device operation information in the secure window comprises pointer location coordinates, selection events, and scroll events.

13. The method of claim 9, further comprising:
encrypting information in the encrypted pointing device reports using homomorphic encryption; and
decrypting the encrypted calculated pointing device operation information using homomorphic decryption.

14. The method of claim 9, further comprising:

receiving indications from the OS responsive to the pointing device entering and exiting the secure window.

15. A computer-readable storage device having instructions recorded thereon that, when executed by a processor, implements a method comprising:

receiving pointing device information generated by pointing device operation in a secure window and an unsecure window displayed by a display unit;

sending pointing device reports to an operating system (OS) for the pointing device operation in the unsecure window to render the pointer in the unsecure window;

sending encrypted pointing device reports to the OS for the pointing device operation in the secure window to conceal the pointing device operation in the secure window from the OS, the OS configured to perform calculations on the encrypted pointing device reports to generate encrypted calculated pointing device information in a manner such that the OS is unaware of user activity in the secure window;

receiving the encrypted calculated pointing device information from the OS responsive to the encrypted pointing device reports;

decrypting the encrypted calculated pointing device information to determine calculated pointing device information for pointing device operations in the secure window; and sending the calculated pointing device information to at least one of the OS or to a computing source of the secure window to render the pointer in the secure window.

16. The computer-readable storage device of claim 15, wherein the sending of the calculated pointing device operation information comprises sending the calculated pointing device operation information in the secure window to the computing source of the secure window to perform the rendering of the pointer in the secure window.

17. The computer-readable storage device of claim 15, wherein the sending of the calculated pointing device operation information comprises sending the calculated pointing device operation information in the secure window to the computing source of the secure window to perform the rendering of the pointer in the secure window.

18. The computer-readable storage device of claim 15, wherein the sending of the calculated pointing device operation information comprises sending the calculated pointing device operation information in the secure window to the OS to perform the rendering of the pointer in the secure window.

19. The computer-readable storage device of claim 15, wherein the pointing device operation information in the secure window comprises pointer location coordinates, selection events, and scroll events.

20. The computer-readable storage device of claim 15, the method further comprising:

encrypting information in the encrypted pointing device reports using homomorphic encryption; and decrypting the encrypted calculated pointing device operation information using homomorphic decryption.

* * * * *